(12) United States Patent
Kumar et al.

(10) Patent No.: US 11,381,328 B2
(45) Date of Patent: Jul. 5, 2022

(54) DETECTION OF VARIATION IN LOAD IMPEDANCE OF WIRELESS COMMUNICATIONS DEVICES

(71) Applicant: Cypress Semiconductor Corporation, San Jose, CA (US)

(72) Inventors: Vipul Kumar, Milpitas, CA (US); Raghuram Kuchibhotla, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 42 days.

(21) Appl. No.: 16/581,137

(22) Filed: Sep. 24, 2019

(65) Prior Publication Data

US 2021/0091867 A1 Mar. 25, 2021

(51) Int. Cl.
| | | |
|---|---|---|
| *H04B 17/345* | (2015.01) | |
| *H04B 1/40* | (2015.01) | |
| *H04W 4/40* | (2018.01) | |
| *H04B 17/14* | (2015.01) | |
| *H04W 84/12* | (2009.01) | |

(52) U.S. Cl.
CPC ............ *H04B 17/345* (2015.01); *H04B 1/40* (2013.01); *H04W 4/40* (2018.02); *H04B 17/14* (2015.01); *H04W 84/12* (2013.01)

(58) Field of Classification Search
CPC ........ H04B 17/14; H04B 17/345; H04W 4/40
See application file for complete search history.

(56) References Cited

U.S. PATENT DOCUMENTS

| | | | |
|---|---|---|---|
| 6,985,113 B2 | 1/2006 | Nishimura et al. | |
| 8,948,713 B2 | 2/2015 | Kratochwil et al. | |
| 9,148,201 B2 | 9/2015 | Kallal et al. | |
| 9,281,849 B2 | 3/2016 | Black et al. | |
| 9,444,511 B2 | 9/2016 | Suh et al. | |
| 9,543,074 B2 | 1/2017 | Park et al. | |
| 9,667,282 B1 * | 5/2017 | Merlin | H04B 1/04 |
| 9,966,802 B2 | 5/2018 | Lee et al. | |
| 9,997,927 B2 | 6/2018 | Eguchi et al. | |
| 2008/0159435 A1 * | 7/2008 | Cohen | H03F 1/34 375/297 |
| 2009/0028574 A1 | 1/2009 | Dybsetter et al. | |

(Continued)

OTHER PUBLICATIONS

Kim, Sung, "Optimization Algorithm for Antenna Impedance Matching in Digitally Tunable Network," University of Waterloo, Sep. 2015, pp. 1-67; 67 pages.

(Continued)

*Primary Examiner* — Charles C Jiang
*Assistant Examiner* — Ryan C Kavleski

(57) ABSTRACT

Systems, methods, and devices detect variations in load impedances of wireless communications devices. Methods include determining a first distortion measurement of a transceiver based on a first comparison of a digital loopback path and a radio frequency (RF) loopback path, and determining a second distortion measurement of the transceiver based on a second comparison of the digital loopback path and the RF loopback path. Methods also include implementing, using a processor, a third comparison of the first distortion measurement and the second distortion measurement, and determining if there is a change in a load of the transceiver based on the third comparison.

20 Claims, 7 Drawing Sheets

(56) References Cited

U.S. PATENT DOCUMENTS

| | | | |
|---|---|---|---|
| 2010/0127945 A1 | 5/2010 | Rousu et al. | |
| 2010/0317297 A1* | 12/2010 | Kratochwil | H04B 17/102 |
| | | | 455/67.11 |
| 2013/0099807 A1 | 4/2013 | Wheeland et al. | |
| 2015/0120219 A1* | 4/2015 | Merlin | H04B 1/0458 |
| | | | 702/58 |
| 2017/0039784 A1* | 2/2017 | Gelbart | G07C 5/0808 |
| 2018/0048193 A1* | 2/2018 | Kovacs | H02J 50/90 |
| 2018/0301923 A1 | 10/2018 | White et al. | |
| 2018/0375388 A1 | 12/2018 | Byun et al. | |
| 2019/0027941 A1 | 1/2019 | Kwon et al. | |
| 2020/0358467 A1* | 11/2020 | Buer | H04B 1/52 |

OTHER PUBLICATIONS

International Search Report for International Application No. PCT/US2020/050831 dated Dec. 10, 2020; 2 pages.
Written Opinion of the International Searching Authority for International Application No. PCT/US2020/050831 dated Dec. 10, 2020; 5 pages.

* cited by examiner

DETECTION OF VARIATION IN LOAD IMPEDANCE OF WIRELESS COMMUNICATIONS DEVICES

TECHNICAL FIELD

This disclosure generally relates to load impedances of wireless communications devices, and more specifically, to detecting variations in load impedances of wireless communications devices.

BACKGROUND

Wireless communications devices may communicate with each other via one or more communications modalities, such as a WiFi connection. Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for assessing connectivity between components in a wireless communication device remain limited because they are not able to efficiently detect interruptions in such connectivity.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may be implemented in a variety of contexts and environments. For example, wireless communications devices may be implemented in computing devices, mobile devices, and other computing environments. In one example, wireless communications devices may be implemented in vehicles to provide communication between components of the vehicle, such as an on-board computer, and other computing devices, such as a mobile device, a cellular network, or another communications network. The wireless communications devices may include transceivers that handle transmit and receive operations in accordance with wireless communications protocols. The transceivers may be coupled to antennas which may facilitate transmission and reception of data over a transmission medium. During operation, connectivity issues may arise between the transceiver and antenna. For example, the antenna may experience a failure and become inoperative, or there may be a connectivity issue between the transceiver and the antenna in which the transceiver is not able to communicate with the antenna.

Embodiments disclosed herein provide methods, devices, and systems for identifying connectivity and/or operational issues with an antenna coupled to a wireless communications device. As will be discussed in greater detail below, the identifying of such connectivity and/or operational events may be based on detecting variations in load impedances of the wireless communications device, and utilizing loopback paths of a transceiver for such detecting. For example, a first distortion measurement may be made based on a comparison of a digital loopback path and a radio frequency (RF) loopback path. In some embodiments, the first distortion measurement may be made when the operational conditions are normal and there are no connectivity issues. Moreover, a second distortion measurement may be made based on a comparison of the digital loopback path and the RF loopback path. The second distortion measurement may be made as part of a diagnostic operation, or responsive to one or more other inputs. As will be discussed in greater detail below, the first and second distortion measurements may be compared to determine if there is a change in a load of the transceiver. In this way, connectivity and operation of the antenna may be verified without the implementation of additional hardware in the transceiver.

Figure 1:
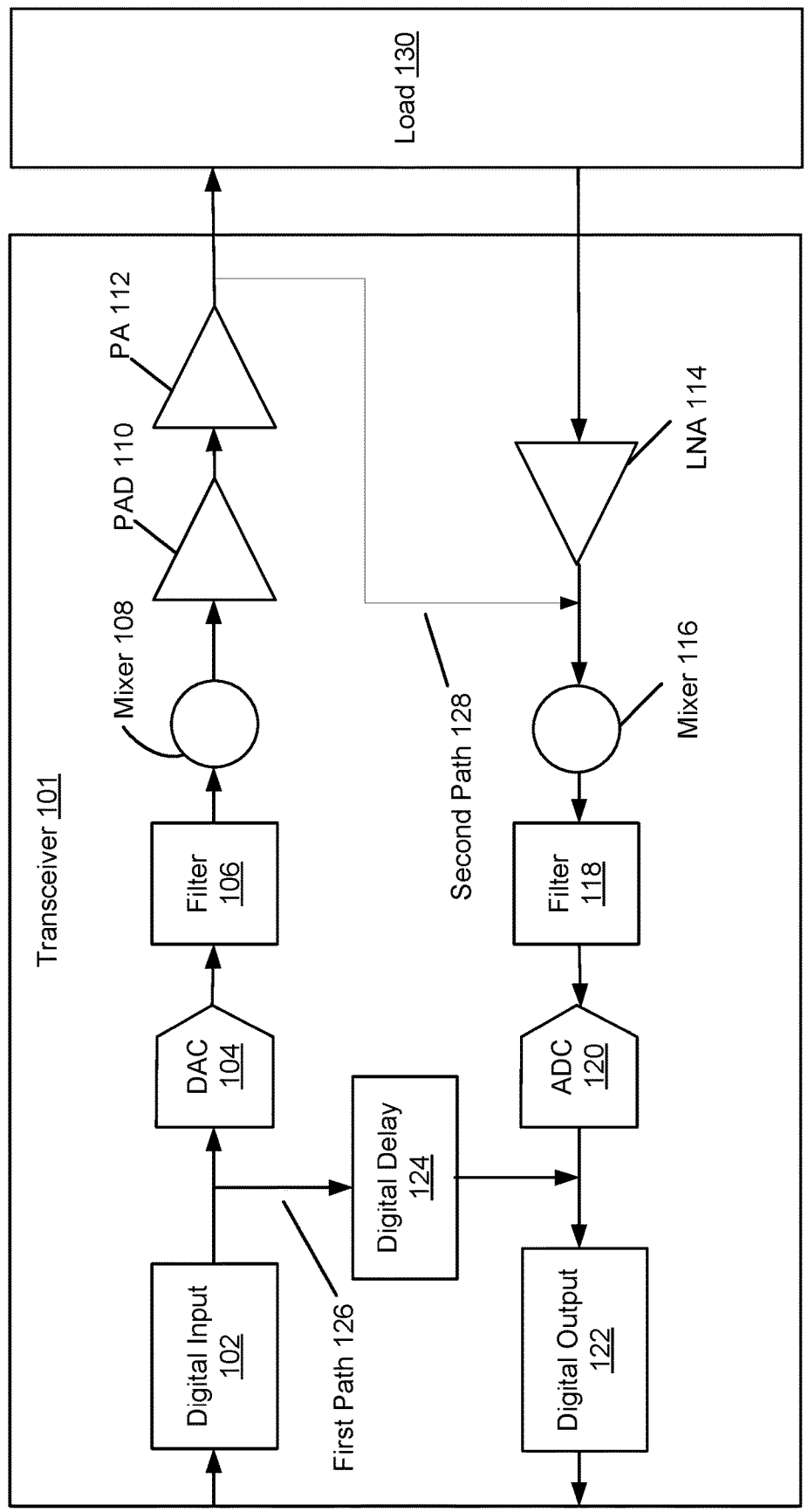
FIG. 1 illustrates a diagram of an example of a system for detection of load impedance variation, configured in accordance with some embodiments.

FIG. 1 illustrates a diagram of an example of a system for detection of load impedance variation, configured in accordance with some embodiments. As discussed above components of a system, such as a transceiver, may be coupled to a load which may include various other components, such as an antenna. During operational conditions, one or more connectivity issues may arise in which connectivity between the transceiver and the antenna may be interrupted or may degrade. Accordingly, devices and systems disclosed herein are configured to detect and identify changes in connectivity between system components. Moreover, such changes may be detected without the implementation of additional hardware.

In various embodiments, system 100 includes transceiver 101 which is configured to transmit and receive data in accordance with a communications protocol. More specifically, transceiver 101 may be a wireless local area network (WLAN) transceiver compatible with a Wi-Fi communications protocol. For example, transceiver 101 may be compatible with an 802.11 communications protocol. While various embodiments disclosed herein are discussed with reference to a Wi-Fi communications protocol, it will be appreciated that transceiver 101 may also be compatible with various other suitable communications protocols, such as a Bluetooth protocol, a Zigbee protocol, as well as any suitable cellular communications technique, such as GSM, 3G, 4G, and 5G.

Transceiver 101 includes various components configured to implement a transmit path and a receive path. While some components of transceiver 101 have not been shown for clarity, such as specific components of a transmitter and a receiver, they have been generally represented as digital input 102 and digital output 122. In some embodiments, digital input 102 may include various components configured to generate a digital signal transmitted by transceiver 101, such as a tone generator. Moreover, digital output 122 may include various components configured to provide a received digital signal to other components of a system, such as a processing device discussed in greater detail below with reference to FIG. 3. Furthermore, digital output 122 may include a comparator, which may be an amplitude and phase comparator that is configured to compare a signal received via first path 126 and a signal received via, at least in part, second path 128. In this way, the comparator may compare a digital loopback signal received via first path 126 and a radio frequency (RF) loopback signal receive via second path 128. The comparator may generate an output signal that represents a phase difference and an amplitude difference between the digital loopback signal and the RF loopback signal. In some embodiments, digital input 102 may include a modulator and digital output 122 may include a demodulator.

In various embodiments, transceiver 101 further includes digital-to-analog converter (DAC) 104 which is configured to convert the output of digital input 102 into an analog signal for subsequent transmission. Transceiver 101 additionally includes filter 106, mixer 108, and power amplifier driver (PAD) 110 which implement additional processing of the output of DAC 104 along a RF transmit path. Transceiver 101 further includes power amplifier (PA) 112 which is configured to amplify the signal provided to a load coupled to transceiver 101, such as load 130. In various embodiments, power amplifier 112 may exhibit non-linear performance characteristics over an operational range. Accordingly, power amplifier 112 may introduce distortion into a signal provided to load 130 due to such non-linear performance characteristics. Such distortion may have amplitude (AM-AM) and phase (AM-PM) components which may vary over different operational parameters such as ambient temperature, operational frequency, and power.

As discussed above, system 100 may also include load 130 which may include an antenna used to transmit and receive data. Accordingly, transceiver 101 is configured to provide a signal to load 130 for transmission along a transmit path, and is also configured to receive a signal from load 130 along a receive path. As will be discussed in greater detail below, load 130 may include additional components, such as a switch and a cable, that may also be included in the communicative pathway between transceiver 101 and the antenna. Furthermore, as will also be discussed in greater detail below, transceiver 101 and load 130 may be implemented in the context of a vehicle, such as an automobile. Accordingly, load 130 may be implemented in an automobile, and the antenna may be a communications antenna of the automobile.

According to some embodiments, transceiver 101 additionally includes a receive path that further includes components such as low noise amplifier (LNA) 114, mixer 116, filter 118, and analog-to-digital converter (ADC) 120 which are configured to receive a signal from load 130, and process the received signal to a digital signal provided to digital output 122, which may then be provided to other downstream components of transceiver 101 and system 100.

Transceiver 101 may also include various additional pathways, such as first path 126 and second path 128. In some embodiments, first path 126 and second path 128 are loopback pathways that are configured to provide feedback between the transmit path and the receive path of transceiver 101. More specifically, first path 126 may be a digital loopback path that provides a loopback path between an output of digital input 102 and an input of digital output 122. Accordingly, first path 126 does not pass through DAC 104, and is implemented prior to conversion to the analog domain. Moreover, in various embodiments, first path 126 includes digital delay 124 that is configured to compensate for latency delays that may be experienced by downstream components of the RF pathway. In some embodiments, second path 128 is an RF loopback path that provides a loopback path between an output of power amplifier 112 and the receive pathway. For example, second path 128 may provide a loopback path between an output of power amplifier 112 and an input of mixer 116. Accordingly, second path 128 provides a loopback path between a tap off point, or an output, of power amplifier 112 and component of the receive path implemented before ADC 120.

As noted above, the operational characteristics of power amplifier 112 may introduce distortion into an output signal provided to load 130. Moreover, such distortion may also be introduced to the signal provided to second path 128. Furthermore, the physical properties of load 130 may also affect the signal provided to second path 128. As shown in FIG. 1, the output of power amplifier 112 may be coupled to both load 130 and second path 128. Accordingly, the physical properties, such as impedance characteristics, of load 130 may affect the voltage at the output of power amplifier 112. As will be discussed in greater detail below, the effect of load 130 on the voltage at the output of power amplifier 112 results in a measurable amount of distortion introduced to the signal provided to second path 128, and changes in load 130 may be detected based on changes in such measured distortion. Additional details regarding distortion measurements and detection of events, such as antenna detection events, are discussed in greater detail below, and more particularly with reference to FIGS. 4-7.

Figure 2:
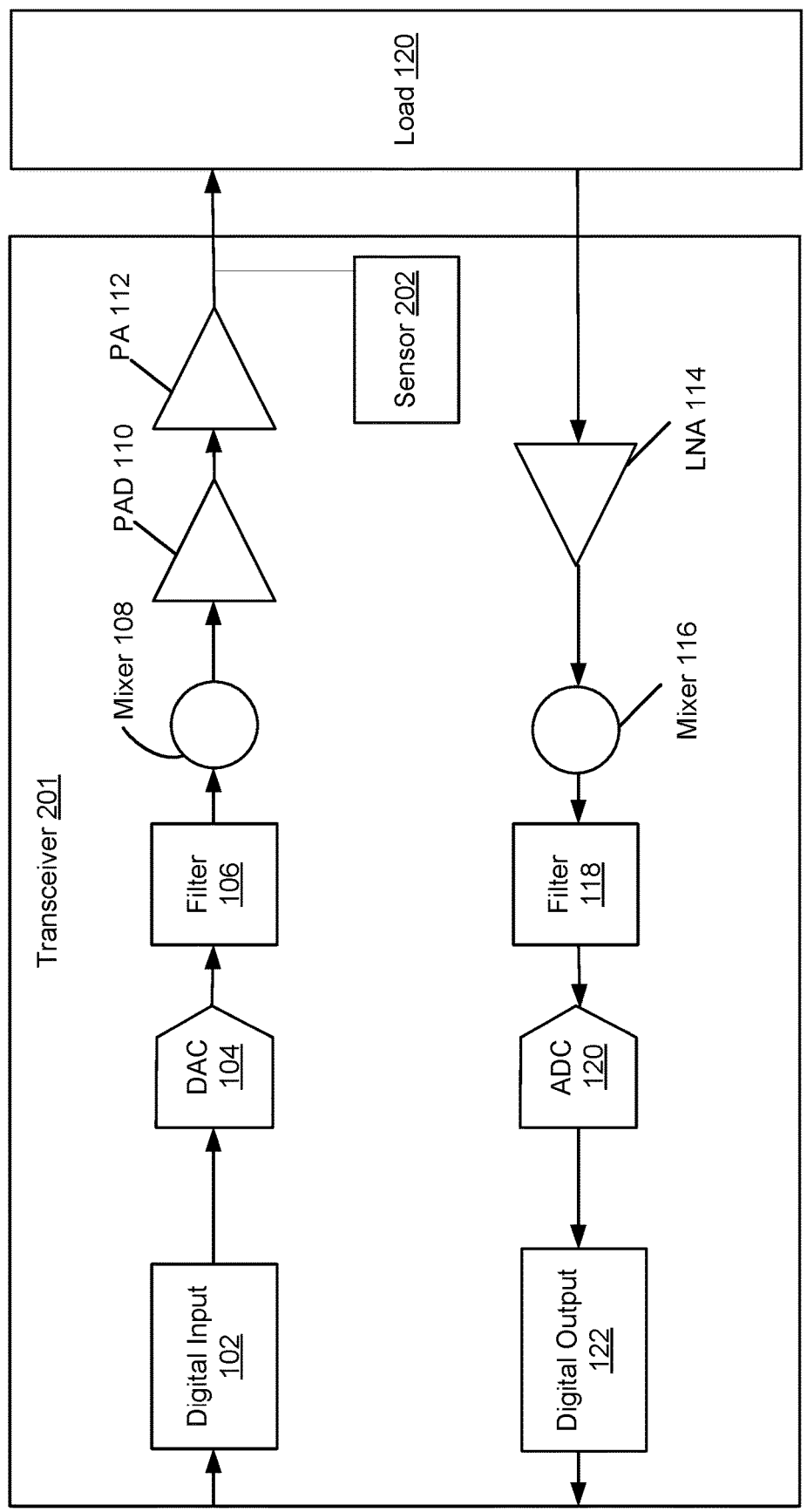
FIG. 2 illustrates a diagram of an example of another system for detection of load impedance variation, configured in accordance with some embodiments.

FIG. 2 illustrates a diagram of an example of another system for detection of load impedance variation, configured in accordance with some embodiments. As discussed above components of a system, such as a transceiver, may be coupled to a load which may include various other components, such as an antenna. As also discussed above, devices and systems disclosed herein are configured to detect and identify changes in connectivity between system components. Accordingly, system 200 describes an additional implementation of a system configured to detect and identify changes in connectivity between system components.

In various embodiments, system 200 includes transceiver 201 and load 130. As similarly discussed above, transceiver 201 may include components of a transmit path such as digital input 102, DAC 104, filter 106, mixer 108, PAD 110, and power amplifier 112. Transceiver 201 may further include components of a receive path such as LNA 114, mixer 116, filter 118, ADC 120, and digital output 122.

As shown in FIG. 2, transceiver 201 may be configured to include sensor 202. Accordingly, sensor 202 may be a voltage sensor or a power sensor that is configured to obtain voltage measurements and/or power measurements, and provide such measurements to another system component, such as a comparator included in digital output 122. Thus, in various embodiments, a second path is replaced by sensor 202, and sensor 202 provides amplitude information to downstream components, such as digital output 122. Accordingly, digital output 122 may utilize the signal provided by sensor 202 to generate distortion information which may be utilized to detect connectivity changes, as will be discussed in greater detail below.

Figure 3:
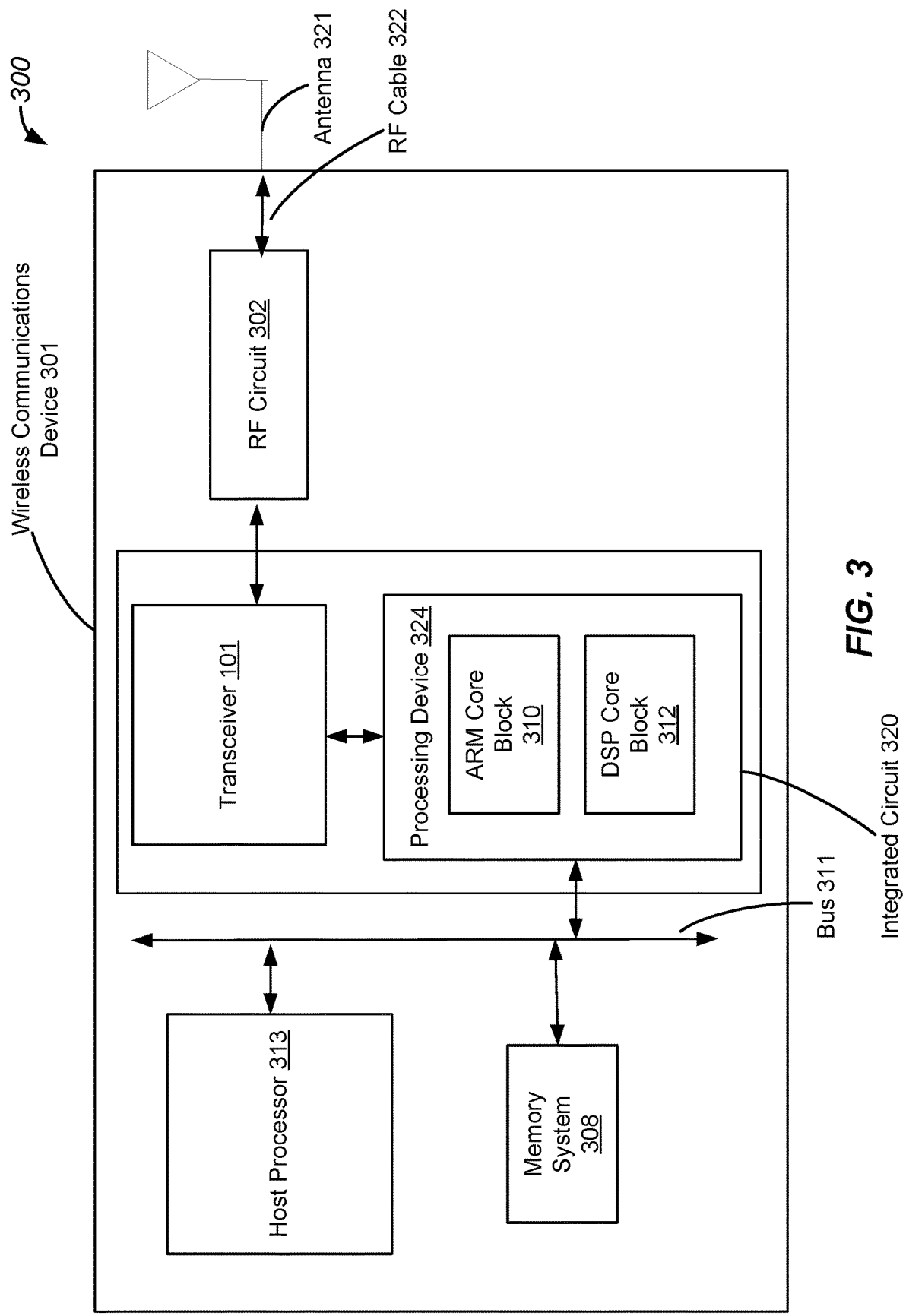
FIG. 3 illustrates a diagram of an example of yet another system for detection of load impedance variation, configured in accordance with some embodiments.

FIG. 3 illustrates a diagram of an example of yet another system for detection of load impedance variation, configured in accordance with some embodiments. More specifically, FIG. 3 illustrates an example of a system, such as system 300, that may include wireless communications device 301. In various embodiments, wireless communications device 301 includes a transceiver, such as transceiver 101 or transceiver 201, discussed above. In one example, system 300 includes transceiver 101 which is configured to transmit and receive signals using a communications medium that may include antenna 321. As noted above, transceiver 101 may be included in a WiFi radio, and may be compatible with a WiFi communications protocol. More specifically, transceiver 101 may be compatible with an 802.11ax protocol. Accordingly, transceiver 101 may include components, such as a modulator and demodulator as well as one or more buffers and filters, that are configured to generate and receive signals via antenna 321.

In various embodiments, system 300 further includes processing device 324 which may include one or more processor cores. In various embodiments, processing device 324 includes one or more processing devices that are configured to implement comparisons of distortion measurements and detection and identification of connectivity issues that will be described in greater detail below. In various embodiments, processing device 324 includes one or more components configured to implement a medium access control (MAC) layer that is configured to control hardware associated with a wireless transmission medium, such as that associated with a WiFi transmission medium. In one example, processing device 324 may include advanced reduced instruction set computing machine (ARM) core block 310 that may be configured to implement a driver, such as a WiFi driver. Processing device 324 may further include digital signal processor (DSP) core block 312 which may be configured to include microcode.

System 300 further includes radio frequency (RF) circuit 302 which is coupled to antenna 321. In various embodiments, RF circuit 302 may include various components such as an RF switch, a diplexer, and a filter. While FIG. 3 illustrates system 300 as having a single antenna, it will be appreciated that system 300 may have multiple antennas. Accordingly, RF circuit 302 may be configured to select an antenna for transmission/reception, and may be configured to provide coupling between the selected antenna, such as antenna 321, and other components of system 300 via a bus, such as bus 311.

System 300 includes memory system 308 which is configured to store one or more data values associated with the measurements and comparisons discussed in greater detail below. Accordingly, memory system 308 includes storage device, which may be a non-volatile random access memory (NVRAM) configured to store such data values, and may also include a cache that is configured to provide a local cache. In various embodiments, system 300 further includes host processor 313 which is configured to implement processing operations implemented by system 300.

It will be appreciated that one or more of the above-described components may be implemented on a single chip, or on different chips. For example, transceiver 101 and processing device 324 may be implemented on the same integrated circuit chip, such as integrated circuit chip 320. In another example, transceiver 101 and processing device 324 may each be implemented on their own chip, and thus may be disposed separately as a multi-chip module or on a common substrate such as a printed circuit board (PCB). It will also be appreciated that components of system 300 may be implemented in the context of a vehicle such as an automobile. Accordingly, some components, such as integrated chip 320, may be implemented in a first location of the automobile, while other components, such as antenna 321, may be implemented in second location of the automobile, and coupling between the two may be implemented via a coupler such as RF cable 322.

Figure 4:
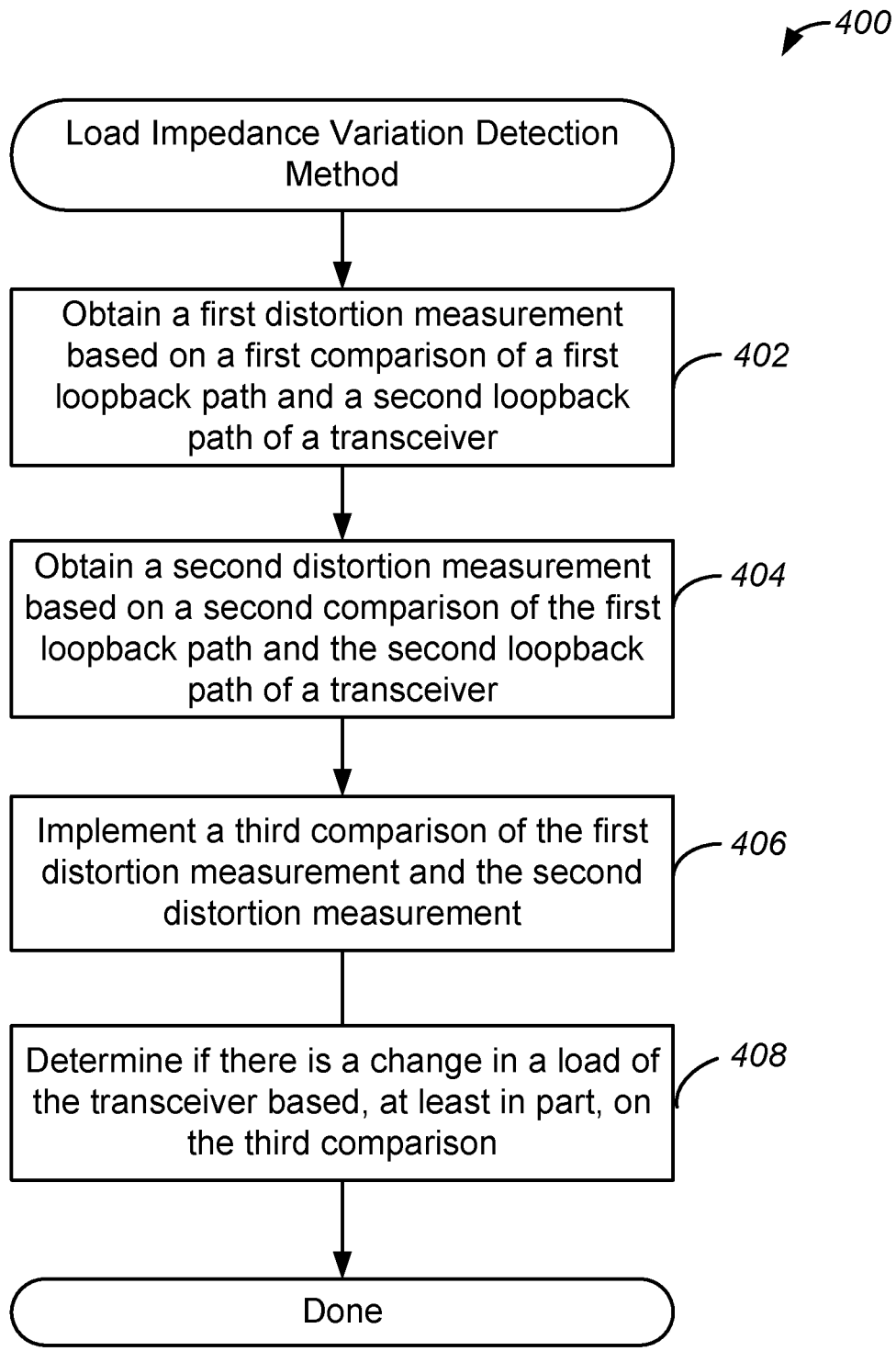
FIG. 4 illustrates a flow chart of an example of a load impedance variation detection method, implemented in accordance with some embodiments.

FIG. 4 illustrates a flow chart of an example of a load impedance variation detection method, implemented in accordance with some embodiments. As discussed above, measurements taken from different feedback loops in a transceiver may be used to detect and identify specific changes that may have occurred with reference to a load coupled to the transceiver. As will be discussed in greater detail below, specific comparisons may be made between such measurements to accurately identify events, such as antenna disconnection events.

Method 400 may commence with operation 402 during which a first distortion measurement may be made based on a first comparison of a first path and a second path. As noted above, the first path may be a digital loopback path and the second path may be an RF loopback path. The first distortion measurement may be a measurement of a phase difference and an amplitude difference between the digital loopback path and the RF loopback path. Other parameters may also be recorded with the first distortion measurement, such as an operational temperature and frequency. As will be discussed in greater detail below, the first measurement may be made during an initialization stage in which connectivity has been verified via another technique that may be implemented during a manufacturing or servicing process. Accordingly, the first measurement may be utilized as a baseline measurement.

Method 400 may proceed to operation 404 during which a second distortion measurement of the transceiver based on a second comparison of the first path and the second path. Accordingly, the second distortion measurement may be an additional measurement of a phase difference and an amplitude difference between the digital loopback path and the RF loopback path. As noted above, other parameters may also be recorded with the first distortion measurement, such as an operational temperature and frequency. As will be discussed in greater detail below, the second measurement may be made during operational conditions of the transceiver. For example, if the transceiver is implemented in an automobile, the second measurement may be made during a diagnostic process implemented after a designated operational period that may be a designated amount of time. In various embodiments, the second measurement may be made responsive to a signal received from another system component, such as a connectivity issue experienced by an on-board computer of a vehicle.

Method 400 may proceed to operation 406 during which a third comparison of the first distortion measurement and the second distortion measurement may be implemented. Accordingly, the first distortion measurement may be compared with the second distortion measurement to determine if the first distortion measurement is different than the second distortion measurement.

Method 400 may proceed to operation 408 during which it may be determined if there is a change in a load of the transceiver based on the third comparison. Accordingly, the difference between the first distortion measurement and the second distortion measurement may be used to determine if the second distortion measurement differs from the first distortion measurement in a manner that identifies or indicates that a particular connectivity event has occurred. For example, the comparison may identify that a difference exists and is indicative of an antenna disconnection event in which something has happened to the antenna, and the antenna is no longer coupled to the transceiver.

Figure 5:
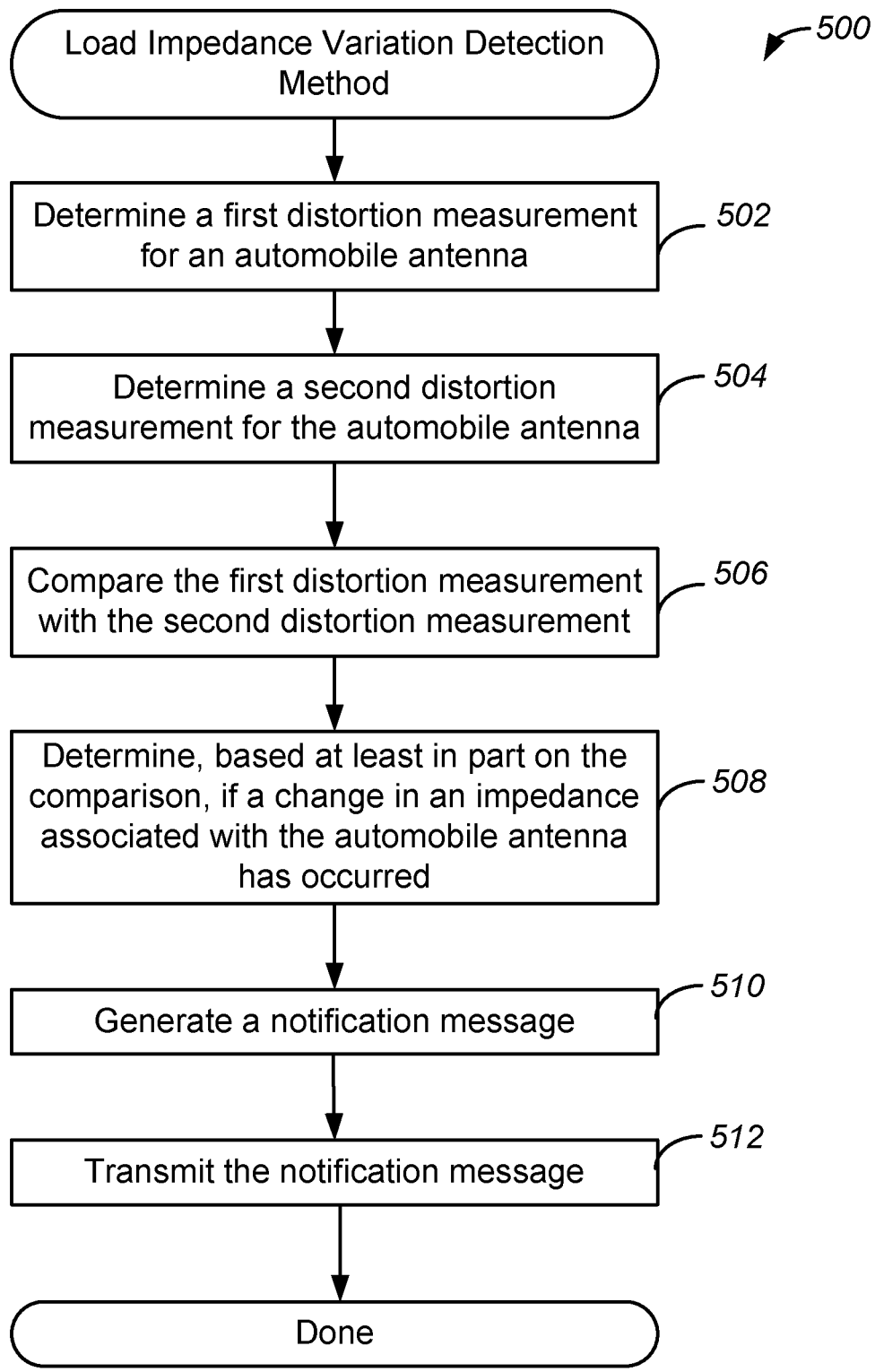
FIG. 5 illustrates a flow chart of another example of a load impedance variation detection method, implemented in accordance with some embodiments.

FIG. 5 illustrates a flow chart of another example of a load impedance variation detection method, implemented in accordance with some embodiments. As discussed above, measurements taken from different feedback loops in a transceiver may be used to detect and identify specific changes that may have occurred with reference to a load coupled to the transceiver. Accordingly, specific comparisons may be made between such measurements to accurately identify events that occur in the context of vehicles, such as automobiles, and also implement one or more operations in response to the identification of such events.

Method 500 may commence with operation 502 during which a first distortion measurement may be determined for an automobile antenna. As similarly discussed above, the first distortion measurement may be made based on a comparison of a first path that is a digital loopback path and a second path that is an RF loopback path. As also noted above, the first distortion measurement may be a measurement of a phase difference and an amplitude difference between the digital loopback path and the RF loopback path, and other parameters may also be recorded with the first distortion measurement, such as an operational temperature and frequency. More specifically, the phase and amplitude measurements may actually be a series of measurements made across a power range. Accordingly, during operation 502, a power sweep may be implemented, and a data series may be acquired for both phase and amplitude. In this example, the stored distortion measurement data may include a data series representing a difference in amplitude between the two paths across a power range that may be defined by operational voltages of the transceiver. The stored measurement may further include a data series representing a difference in phase between the two paths at the time of initiation of operation 502.

In some embodiments, a signal from the first path may be represented by the following equation:

$$A_D \sin(wt+\phi_D) \quad (1)$$

Moreover, a signal from the second path may be represented by the following equation:

$$A_{RF} \sin(wt+\phi_{RF}) \quad (2)$$

In various embodiments, $A_D$ is an amplitude of the digital loopback path and $\phi_D$ is a phase of the digital loopback path. Moreover, $A_{RF}$ is an amplitude of the RF loopback path, $\phi_{RF}$ is a phase of the RF loopback path, and $\phi_D$ is designated by the digital delay. The comparison of the two signals may be represented by the following equations:

$$A_o = \frac{A_{RFo}}{A_{Do}} \quad (3)$$

$$\phi_o = \phi_{RFo} - \phi_{Do} \quad (4)$$

In various embodiments, $A_o$ is an ideal amplitude where there is little to no distortion. Moreover, $\phi_o$ is an ideal phase where there is little to no distortion. Accordingly, $A_o$ and $\phi_o$ are used as reference values. In various embodiments, outputs of a component discussed above, such as a digital output or a comparator of a digital output, may be represented by the following equations:

$$A_i = \frac{A_{RFi}}{A_o} \quad (5)$$

$$\phi_i = \phi_{RFi} - \phi_o \quad (6)$$

Accordingly, $A_i$ is an output of an amplitude comparison at a given power (i), and $\phi_i$ is an output of a phase comparison at the given power (i). A distortion measurement vector may be computed at a given power as noted in the following equations:

$$\vec{r_i} = A_i \angle \phi_i \quad (7)$$

$$\vec{r_i} = A_i \cos(\phi_i) + jA_i \sin(\phi_i) \quad (8)$$

$$\vec{r_i} = x_i + jy_i \quad (9)$$

Therefore, a vector may be calculated at each power level, and a vector series is stored as a first data series that is a first distortion measurement. For example, the first vector series may be represented by the following equation:

$$R_1 = [\vec{r_{11}}, \vec{r_{21}}, \vec{r_{31}}, ..., \vec{r_{N1}}] \quad (10)$$

Method 500 may proceed to operation 504 during which a second distortion measurement may be determined for the automobile antenna. Accordingly, as noted above, the second distortion measurement may be a measurement of a phase difference and an amplitude difference between the digital loopback path and the RF loopback path, and other parameters may also be recorded with the second distortion measurement, such as an operational temperature and frequency. In some embodiments, one or more parameters, such as an operational frequency, may be set prior to acquisition of the second distortion measurement to match at least some of the conditions of the first distortion measurement. In various embodiments, the second distortion measurement may include a data series acquired over a power range. In this example, the data series represents a difference in amplitude between the two paths across the power range at the time of initiation of operation 504. Moreover, the data series represents a difference in phase between the two paths across the power range at the time of initiation of operation 504.

In various embodiments, during operation 504, a second vector series is generated. As similarly discussed above, the second vector series is stored as a second data series that represents a second distortion measurement, and the second vector series may be represented by the following equation $$R_2 = [\vec{r_{12}}, \vec{r_{22}}, \vec{r_{32}}, ..., \vec{r_{N2}}] \quad (11)$$

Method 500 may proceed to operation 506 during which a comparison may be implemented for the first and second distortion measurements. As noted above, the first distortion measurement may be compared with the second distortion measurement to determine if the first distortion measurement is different than the second distortion measurement. More specifically, the first distortion measurement and the second distortion measurement may be used to generate a composite metric that represents a difference between the measurements of the first path and the second path that may have occurred between the time of operation 502 and the time of operation 504.

Accordingly, the first distortion measurement data and the second distortion measurement data may be used to generate a difference vector between the two, and a magnitude of the difference vector may be stored as the composite metric. As will be discussed in greater detail below, this difference vector may be used to determine if an antenna connection event has occurred. In various embodiments, the difference vector may be represented by the following equations:

$$S = R_2 - R_1 \tag{12}$$

$$S = [(\vec{r_{12}} - \vec{r_{11}}), (\vec{r_{22}} - \vec{r_{21}}), (\vec{r_{32}} - \vec{r_{31}}), \ldots] \tag{13}$$

$$S = [s_1, s_2, s_3, \ldots, s_N] \tag{14}$$

$$s_i = (x_{i2} - x_{i1}) + j(y_{i2} - y_{i1}) \tag{15}$$

Method 500 may proceed to operation 508 during which it may be determined, based on the comparison, if a change has occurred. Accordingly, the delta values determined during operation 506 may be retrieved and compared against a designated threshold value. If the delta values are greater than the threshold value, it may be determined that an antenna disconnection event has occurred. In various embodiments, the threshold value may be a predetermined or designated value which may have been previously stored in memory, and may have been determined by an entity, such as a diagnostic technician. If the delta values are less than the threshold value, it may be determined that an antenna disconnection event has not occurred.

In various embodiments, an error vector may be determined based on the difference vector discussed above. More specifically, an error vector may be determined by the following equation representing a summation of the magnitude of all elements in S:

$$EVM_S = \Sigma |s_i| \tag{16}$$

In various embodiments, the value of $EVM_S$ may be compared against a designated value, to determine if an antenna disconnection event has occurred. For example, if $EVM_S$ is relatively small and close to zero, it may be determined that no disconnection event has occurred. If $EVM_S$ is relatively large, and greater than the designated value, it may be determined that a disconnection event has occurred.

Method 500 may proceed to operation 510 during which a notification message may be generated. If it is determined during operation 508 that an antenna disconnection event has occurred, then a notification message may be generated. Accordingly, during operation 510, a notification message and an associated data log may be generated and stored which store the result of the comparison and determination at operation 508. In one example in which the transceiver is implemented in an automobile, a notification message may be generated and stored in the automobile's computer, and may also be sent to one or more servers operated by the automobile manufacturer if an additional communication medium is available. For example, if the WiFi communication medium has experienced a connectivity issue, but cellular communication is still available, the notification message may be configured specifically for transmission over the cellular communications medium and associated cellular network.

Method 500 may proceed to operation 512 during which the notification message may be transmitted. As discussed above, the notification message may be configured to be sent to one or more servers of another entity, such as an automobile manufacturer. Accordingly, during operation 512, the notification message may be transmitted from the automobile and may be received by the automobile manufacturer. In this way, the automobile manufacturer may be notified of one or more connectivity issues, such as an antenna disconnection event. In various embodiments, the entity may be yet another entity, such as a service or repair center. Accordingly, the service or repair center may be notified and may implement one or more operations responsive to receiving the notification, such as scheduling a service and/or updated a data record associated with the automobile.

Figure 6:
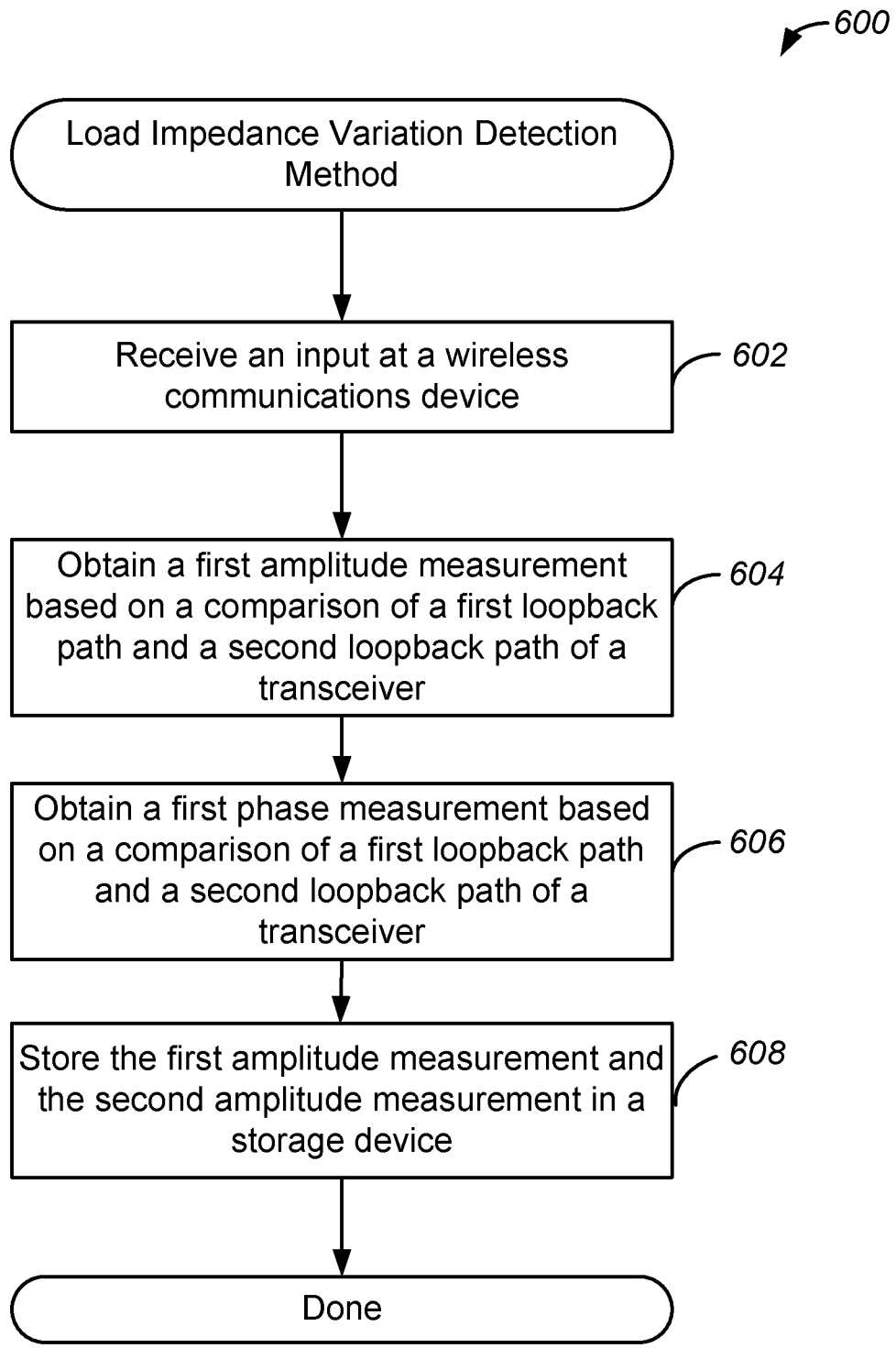
FIG. 6 illustrates a flow chart of yet another example of a load impedance variation detection method, implemented in accordance with some embodiments.

FIG. 6 illustrates a flow chart of yet another example of a load impedance variation detection method, implemented in accordance with some embodiments. As discussed above, measurements taken from different feedback loops in a transceiver may be used to detect and identify specific changes that may have occurred with reference to a load coupled to the transceiver. As will be discussed in greater detail below, a first distortion measurement may be obtained as part of a baseline determination or calibration technique that may be implemented for a transceiver. For example, such a technique may be implemented upon completion of assembly of an automobile.

Method 600 may commence with operation 602 during which an input may be received. In various embodiments, the input may be an input provided from a user or entity, such as a technician. The input may be a command provided via a computer interface of the automobile. In one example, the input may be received via a vehicle diagnostic interface. In various embodiments, the command causes the initiation of a calibration of the transceiver.

Method 600 may proceed to operation 604 during which a first amplitude measurement may be made. As similarly discussed above, the first amplitude measurement may be a measurement of a difference in amplitude between a digital loopback path and an RF loopback path across a designated power range. Accordingly, the first amplitude measurement may represent a first amplitude distortion measurement.

Method 600 may proceed to operation 606 during which a first phase measurement may be made. As similarly discussed above, the first phase measurement may be a measurement of a difference in phase between the digital loopback path and the RF loopback path across the designated power range. Accordingly, the first phase measurement may represent a first phase distortion measurement.

Method 600 may proceed to operation 608 during which the first phase measurement and the second phase measurement may be stored in a storage device of the automobile. Accordingly, the measurement data may be stored as a baseline or calibration measurement, and may also be stored with other operational parameters, such as an operational frequency as well as an ambient temperature. As will be discussed in greater detail below with reference to FIG. 7, this first measurement data may be subsequently retrieved and utilized to determine if an antenna disconnection event has subsequently occurred.

Figure 7:
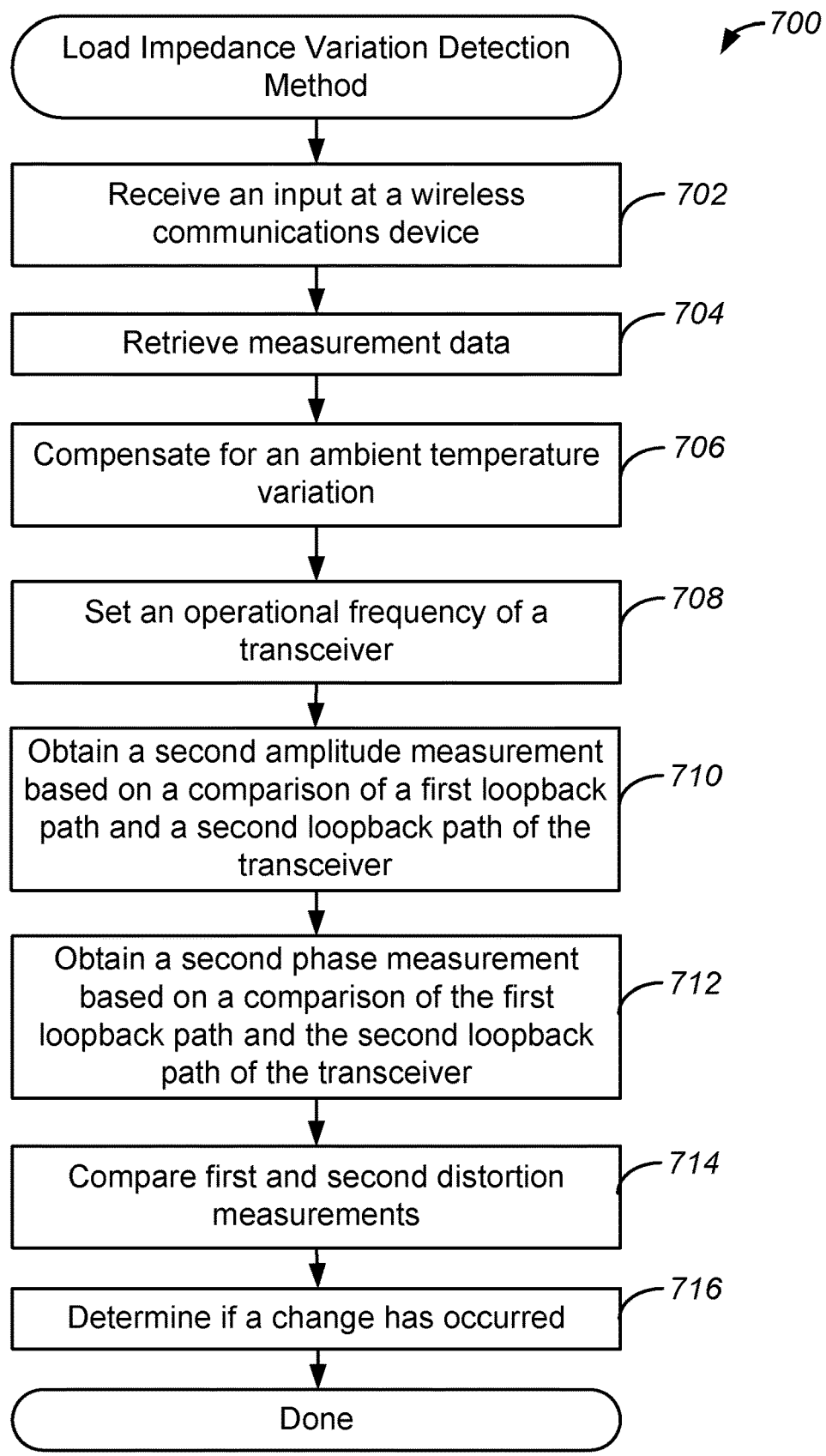
FIG. 7 illustrates a flow chart of an additional example of a load impedance variation detection method, implemented in accordance with some embodiments.

FIG. 7 illustrates a flow chart of an additional example of a load impedance variation detection method, implemented in accordance with some embodiments. As discussed above, measurements taken from different feedback loops in a transceiver may be used to detect and identify specific changes that may have occurred with reference to a load coupled to the transceiver. As will be discussed in greater detail below, a second distortion measurement may be obtained as part of a diagnostic technique that may be implemented for a transceiver. For example, such a technique may be implemented during operation of an automobile, at a subsequent service or maintenance event, or in response to another event that may have occurred during operation, such as a failure to transmit or receive data.

Method 700 may commence with operation 702 during which an input may be received. As similarly discussed above, the input may be an input provided from a user or entity, such as a technician. The input may be a command provided via a computer interface of the automobile. In one example, the input may be received via a vehicle diagnostic interface. In various embodiments, the command causes the initiation of a diagnostic mode of the transceiver. In various embodiments, the input may be a notification or message received from another component of the automobile. For example, the automobile's computer may attempt to send data as part of the operation of one or more on-board applications, such as a navigation application or an application that communicates with a user's mobile device. The automobile's computer may fail to receive acknowledgement replies when transmitting, and may generate and send an input to the transceiver that initiates one or more diagnostic operations.

Method 700 may proceed to operation 704 during which stored measurement data may be retrieved. In various embodiments, measurement data may have been obtained as noted above with reference to FIG. 6. Accordingly, during operation 704, such measurement data and stored operational parameters may be retrieved.

Method 700 may proceed to operation 706 during which an ambient temperature may be checked. Accordingly, the current ambient temperature of the transceiver may be measured and stored. This measured temperature may be compared with the temperature retrieved during operation 704. If the measured temperature is different than the retrieved temperature, a temperature offset may be identified based, at least in part, on one or more predetermined offset values. For example, a set of offset values may have been previously stored in a storage device of the transceiver, and the set of offset values may include a mapping of identified temperature differences to offset values that should be applied to measurements made during operations 710 and 712 discussed below.

Method 700 may proceed to operation 708 during which an operational frequency may be set. Accordingly, the transceiver may be set to the operational frequency identified in the stored data retrieved during operation 704. In this way, the operational frequency of the transceiver may be set to match the operational frequency used during method 600.

Method 700 may proceed to operation 710 during which a second amplitude measurement may be made. As similarly discussed above, the second amplitude measurement may be a measurement of a difference in amplitude between a digital loopback path and an RF loopback path across a designated power range. Accordingly, the second amplitude measurement may represent a second amplitude distortion measurement.

Method 700 may proceed to operation 712 during which a second phase measurement may be made. As similarly discussed above, the second phase measurement may be a measurement of a difference in phase between the digital loopback path and the RF loopback path across the designated power range. Accordingly, the second phase measurement may represent a second phase distortion measurement.

Method 700 may proceed to operation 714 during which a comparison may be implemented for the first and second distortion measurements. As noted above, the first distortion measurement may be compared with the second distortion measurement to determine if the first distortion measurement is different than the second distortion measurement. More specifically, the first distortion measurement and the second distortion measurement may be used to generate a composite metric that represents a difference between the measurements of the first path and the second path that may have occurred between the time at which the calibration was implemented, and the time at which the diagnostic is being implemented.

Method 700 may proceed to operation 716 during which it may be determined, based on the comparison, if a change has occurred. Accordingly, the delta values determined during operation 714 may be compared against a designated threshold value. If the delta values are greater than the threshold value, it may be determined that an antenna disconnection event has occurred. If the delta values are less than the threshold value, it may be determined that an antenna disconnection event has not occurred.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
    determining a first distortion measurement of a transceiver based on a first phase difference and a first amplitude difference between a digital loopback path and a radio frequency (RF) loopback path;
    determining a second distortion measurement of the transceiver based on a second phase difference and a second amplitude difference between the digital loopback path and the RF loopback path;
    implementing, using a processor, a comparison of the first distortion measurement and the second distortion measurement; and
    determining if there is a change in a load coupled to the transceiver based on the comparison.

2. The method of claim 1, wherein the first distortion measurement comprises a first amplitude distortion measurement and a first phase distortion measurement, and wherein the second distortion measurement comprises a second amplitude distortion measurement and a second phase distortion measurement.

3. The method of claim 1, wherein the implementing of the comparison comprises:
    generating a difference vector based on the first distortion measurement and the second distortion measurement.

4. The method of claim 3, wherein the determining if there is a change in the load is based on a magnitude of the difference vector.

5. The method of claim 1, wherein the change in the load identifies an antenna disconnection event.

6. The method of claim 1, wherein the transceiver is included in an automobile, and the load of the transceiver comprises an antenna of the automobile.

7. The method of claim 6 further comprising:
generating a notification message identifying an antenna disconnection event.

8. The method of claim 7 further comprising:
transmitting, via a cellular network, the notification message to a server.

9. The method of claim 1, wherein the determining if there is a change in the load of the transceiver is responsive to an input received at a vehicle diagnostic interface.

10. A device comprising:
a radio frequency (RF) loopback path coupled to an output of a power amplifier of a transceiver;
a digital loopback path coupled between a digital input and a digital output of the transceiver; and
a processor configured to:
determine a first distortion measurement based on a first phase difference and a first amplitude difference between the digital loopback path and the RF loopback path;
determine a second distortion measurement of the transceiver based on a second phase difference and a second amplitude difference between the digital loopback path and the RF loopback path;
implement a comparison of the first distortion measurement and the second distortion measurement; and
determine if there is a change in a load coupled to the transceiver based on the comparison.

11. The device of claim 10, wherein the first distortion measurement comprises a first amplitude distortion measurement and a first phase distortion measurement, and wherein the second distortion measurement comprises a second amplitude distortion measurement and a second phase distortion measurement.

12. The device of claim 10, wherein the processor is further configured to:
generate a difference vector based on the first distortion measurement and the second distortion measurement, wherein the determining if there is a change in the load is based on a magnitude of the difference vector.

13. The device of claim 10, wherein the transceiver is a wireless local area network (WLAN) transceiver that is compatible with a Wi-Fi protocol.

14. The device of claim 10, wherein the change in the load identifies an antenna disconnection event.

15. The device of claim 10, wherein the transceiver is included in an automobile, and the load of the transceiver comprises an antenna of the automobile.

16. A system comprising:
an antenna; and
a transceiver coupled to the antenna, the transceiver comprising:
a radio frequency (RF) loopback path coupled to an output of a power amplifier of the transceiver;
a digital loopback path coupled to between a digital input and a digital output of the transceiver; and
a processor configured to:
determine a first distortion measurement based on a first phase difference and a first amplitude difference between the digital loopback path and the RF loopback path;
determine a second distortion measurement of the transceiver based on a second phase difference and a second amplitude difference between the digital loopback path and the RF loopback path;
implement a comparison of the first distortion measurement and the second distortion measurement; and
determine if there is a change in a load coupled to the transceiver based on the comparison.

17. The system of claim 16, wherein the first distortion measurement comprises a first amplitude distortion measurement and a first phase distortion measurement, and wherein the second distortion measurement comprises a second amplitude distortion measurement and a second phase distortion measurement.

18. The system of claim 16, wherein the processor is further configured to:
generate a difference vector based on the first distortion measurement and the second distortion measurement, wherein the determining if there is a change in the load is based on a magnitude of the difference vector.

19. The system of claim 16, wherein the transceiver is implemented in an integrated circuit (IC), and wherein the IC is coupled to the antenna.

20. The system of claim 19, wherein the load further comprises:
an RF switch configured to select the antenna.

* * * * *